No. 843,777. PATENTED FEB. 12, 1907.
E. R. TAYLOR.
METALLURGICAL PROCESS.
APPLICATION FILED MAY 27, 1902.

3 SHEETS—SHEET 1.

Witnesses:
R. A. Balderson
W. E. Neff

Inventor:
Edward R. Taylor
by Byrnes & Townsend
Attorneys.

No. 843,777. PATENTED FEB. 12, 1907.
E. R. TAYLOR.
METALLURGICAL PROCESS.
APPLICATION FILED MAY 27, 1902.

3 SHEETS—SHEET 2.

Witnesses:
R. A. Baldwin
W. E. Neff

Inventor:
Edward R. Taylor
by Byrnes & Townsend
Attorneys.

No. 843,777. PATENTED FEB. 12, 1907.
E. R. TAYLOR.
METALLURGICAL PROCESS.
APPLICATION FILED MAY 27, 1902.

3 SHEETS—SHEET 3.

Witnesses:
R. A. Baldwin
W. E. Neff

Inventor:
Edward R. Taylor
by Byrnes & Townsend
Attorneys

UNITED STATES PATENT OFFICE.

EDWARD R. TAYLOR, OF PENN YAN, NEW YORK.

METALLURGICAL PROCESS.

No. 843,777.  Specification of Letters Patent.  Patented Feb. 12, 1907.

Application filed May 27, 1902. Serial No. 109,213.

*To all whom it may concern:*

Be it known that I, EDWARD R. TAYLOR, a citizen of the United States, residing at Penn Yan, in the county of Yates and State of New York, have invented certain new and useful Improvements in Metallurgical Processes, of which the following is a specification.

This invention comprises a metallurgical process particularly designed for the production of volatile elements, the required temperature being preferably developed by the passage of the electric current through a body of granular conductive material.

The objects of my invention are to provide a continuous process for the reduction and condensation of volatile elements and to provide a method of charging furnaces which shall at the same time protect the fixed elements thereof from the action of the products of reduction and obviate to a great extent the loss of heat by radiation from the furnace-walls and by convection by the products of reduction.

Figure 1:
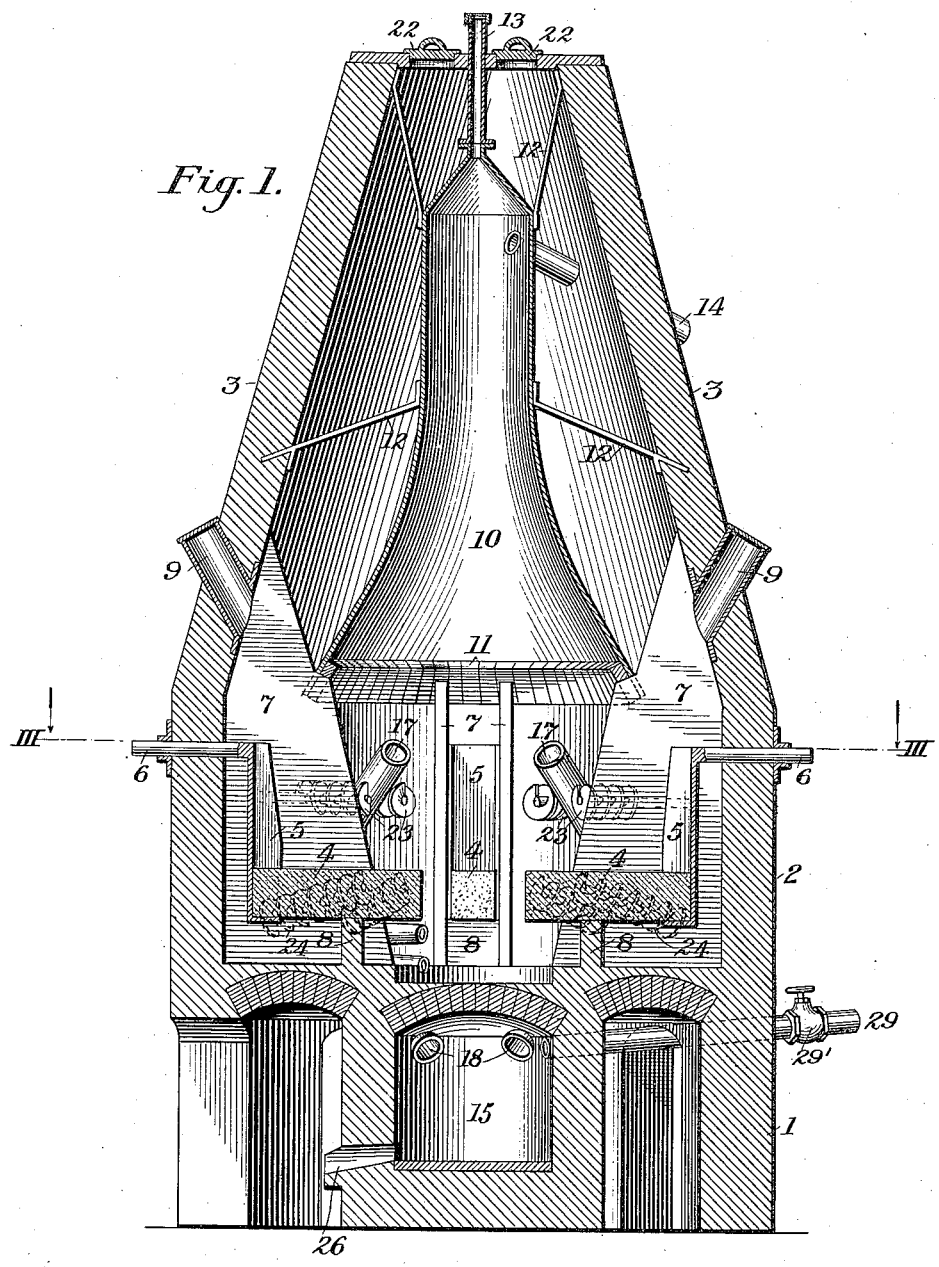
Figure 2:
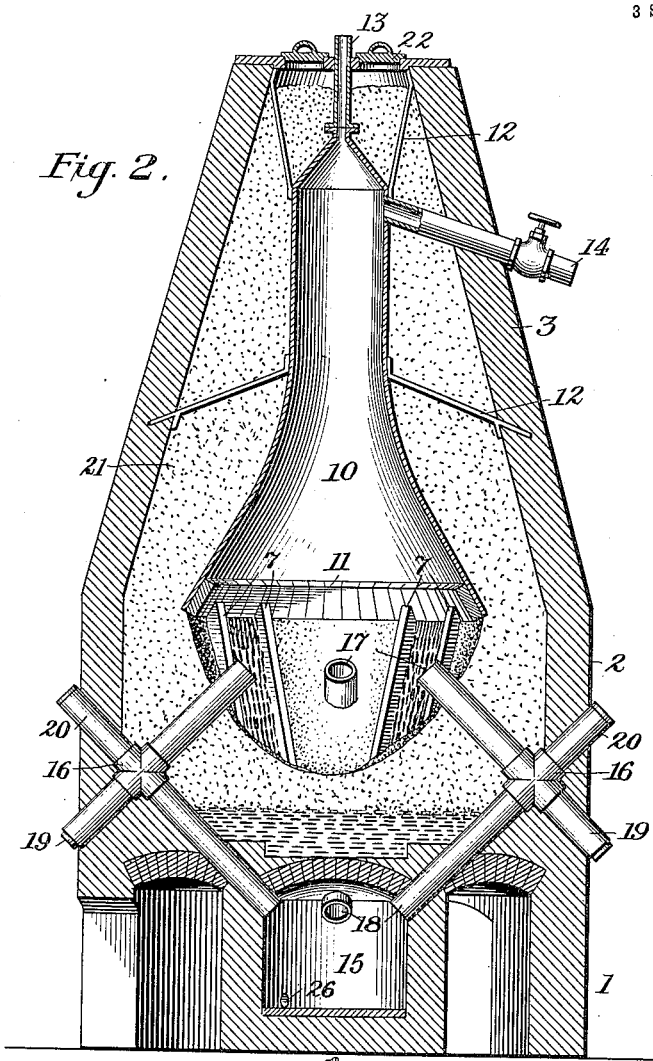
Figure 3:
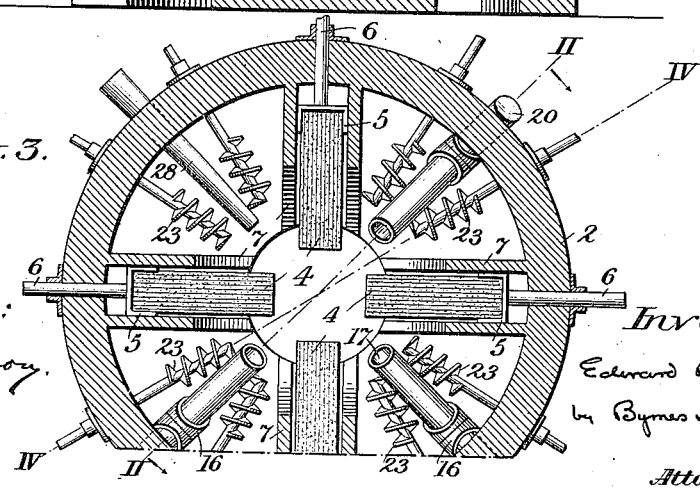
Figure 4:
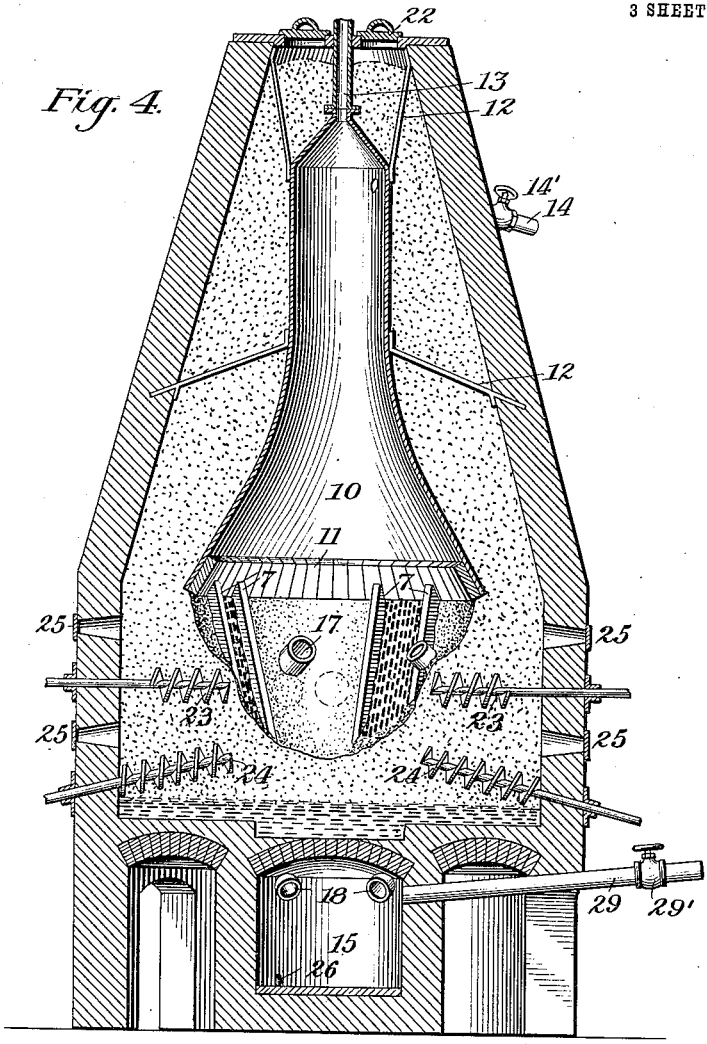
Figure 5:
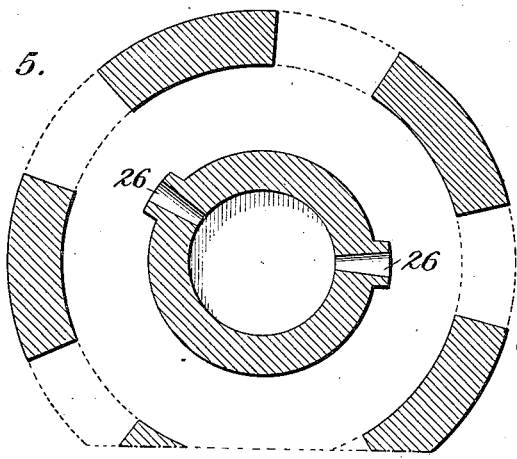

Referring to the accompanying drawings, Figure 1 represents the furnace in vertical central section on line I I of Fig. 3. Fig. 2 is a vertical central section of the furnace, on a somewhat reduced scale, on line II II of Fig. 3. Fig. 3 is a horizontal section on line III III of Fig. 1. Fig. 4 is a vertical central section on line IV IV of Fig. 3, and Fig. 5 is a horizontal section on line V V of Fig. 4.

The furnace structure comprises a base 1, a reducing-chamber 2, and a shaft 3 for the introduction of the charge and withdrawal of certain gaseous reaction products. The base may be formed, as shown, of a series of masonry arches supporting the superstructure and inclosing a collecting-chamber 15. Within the furnace and somewhat above the base are horizontal electrodes 4, of carbon, preferably graphitized, supported by masonry piers 8 and provided with metallic conductors 5 6. These electrodes are shown as four in number; but obviously their number may be varied. On either side of each electrode and in close proximity thereto are vertical retaining-walls 7, and between each pair of walls and near the upper portion thereof is a charging-aperture 9, provided with a suitable closure.

In the upper portion of the furnace and shown as supported in part by the walls 7 is a hood or bell 10, flaring outward and downward and serving for the collection and withdrawal of a portion or all of the gaseous products of the reaction. This hood may be constructed of iron, steel, or suitable refractory material and is preferably protected at the part exposed to the highest temperature by a lining 11, as of refractory brick. Additional supports or hangers for the hood are shown at 12. The hood is provided with a tubular extension 13, capped by a mica plate and serving as a sight-hole through which the progress of the operation may be noted.

14 indicates the exit-pipe for the withdrawal of certain reaction-gases.

Within the base of the furnace is the chamber 15, before referred to, which serves for the collection of certain of the furnace products. This chamber communicates with the furnace proper by conduits 16, which may be constructed, as indicated, of fire-clay tubes, or which may be formed or built within the masonry of the furnace. As shown, these conduits are provided with legs 17, extending into the interior of the furnace at a point somewhat above the electrodes, and with legs 18 extending to the collecting-chamber 15. Legs 19 and 20 in prolongation of legs 17 and 18, above mentioned, pass through the furnace-walls and are provided with suitable external closures. These extensions afford an opportunity for inspecting and cleaning the conduits, while by the provision of a plurality of such conduits, shown as three in number, the continuity of the operation is assured. In certain cases it may be desirable to withdraw certain of the furnace products through the legs 19. Adjacent to these conduits, and preferably arranged at two or more levels in the furnace, are a plurality of screws or equivalent mechanical devices 23 24, constructed and arranged to continuously or from time to time force portions of the furnace charge through the surrounding charge into the reaction zone. As best shown in Fig. 3, a plurality of these screws are arranged radially around the periphery of the furnace and in operation serve to force the material into the field of reaction between the electrodes. As best shown in Fig. 4, the screws are mounted in two or more superposed rows, the screws 23 of the upper row being bladed at their inner ends only, while the screws 24 of the lower row are bladed from their inner ends nearly or quite to the furnace-walls and incline upwardly toward the reaction zone. The purpose and effect of this construction is to insure that the portions of the charge which descend along the periphery of the furnace past the screws 23 shall be conveyed by the screws 24 to the field of reaction through the surrounding charge. A series of stoke-holes 25 are provided at points around the furnace-walls. Tap-holes 26 are provided for the withdrawal of the material from the collecting-chamber 15, and tap-holes 27 28 are provided for withdrawing reduction products and slag from beneath the electrodes.

As stated above, my process contemplates particularly the treatment of ores or compounds capable of yielding a volatile element.

The operation will now be described in connection with the reduction of ores containing zinc, it being understood that the process is not limited thereto, but is capable of general application in metallurgy. Ores mixed with carbon and, if desired, with a suitable flux are introduced through charging-openings 22 and pass downward around the hood 10 to the lower portion of the furnace. Divided conductive material, as retort carbon or coke, is introduced through the charging-tubes 9 and gravitates over and between the electrodes 4, filling the space between the retaining-walls 7 and also falling between the working faces of the electrodes 4 and there forming a granular bed, in which the necessary temperature is developed. This granular bed of carbon between the electrodes constitutes the reaction zone of the furnace. The ore adjacent thereto is brought to a temperature sufficient to determine its reduction, and by rotation of the screws 23 24 fresh quantities of the charge are fed forward into, around, and upon this reaction zone, there to be reduced in turn. This feeding may be aided, when necessary, by stoking through the holes 25. As the ore is moved forward into the reaction zone it is replaced by fresh quantities descending around the periphery of the furnace. Any slag and non-volatile reduction products collecting beneath the electrodes may be drawn off through tap-holes 27 28. The gaseous products of reaction, including the gases developed by the reduction, and the zinc or other volatile element of the ore pass upward toward the interior of the bell or hood 10. The heavier constituents, as the zinc, will tend to pass through the conduits 16 and being condensed therein will collect in the chamber 15, while the fixed gases or a portion of them escape through the outlet 14 from the upper portion of the bell 10. From the collecting-chamber 15 a pipe 29, provided with valve 29', extends outward and upward and serves to conduct from the chamber any uncondensed vapors. The two outlets for vapors 14 and 29 being each provided with suitable valves, the direction of movement of the vapors and gases arising from the reaction may be accurately controlled. By partially closing the valve 14' in pipe 14 a definite movement of the volatile portions of the charge may be maintained through the conduits 16 and the collecting-chamber 15.

As will readily be understood, the process is designed to obviate to the greatest possible degree loss of heat by radiation from the furnace-walls and the corrosive action of the products upon the fixed elements of the furnace. The walls are protected at all points by the incoming charge and streams of conductive material, and the charge, being introduced around the periphery of the furnace and thence fed along radial lines to the reaction zone, operates to absorb, collect, and return to said reaction zone the heat which would otherwise be lost by radiation from the furnace-walls. Furthermore, the heat which is liberated by the condensation of volatile products in the conduits 16 is imparted in like manner to portions of the charge moving toward the reaction zone. Furthermore, the fixed gases of reaction, whether escaping through the hood or bell 10 or through the condensing-conduits 16, in like manner impart their heat to the incoming charge. The result of this construction is a furnace of very high efficiency.

My process may be carried out in other furnaces than those illustrated. For instance, the furnace may be constructed of an external wall and an interior chamber spaced away from said wall, a series of condensing-tubes passing through the internal and external walls and the intervening space. In this construction the electrodes are arranged in the lower portion of the furnace, and the volatile products of reaction, passing upward into the inner chamber and thence through the tubes, are in part condensed in the latter. In this construction the ore is fed through the annular chamber between the spaced walls over and around the condensing-tubes, receives the heat liberated by the volatile products, and is then introduced through apertures in the inner wall to the reaction zone.

The furnace herein described is claimed in my copending application, Serial No. 107,483, filed May 15, 1902.

I claim—

1. The herein-described metallurgical process, which consists in feeding a suitable charge downwardly in proximity to the periphery of a furnace, and feeding portions of said charge inwardly through a surrounding body of the charge to a central reaction zone.

2. The herein-described metallurgical process, which consists in feeding a suitable charge downwardly in proximity to the periphery of a furnace, feeding portions of said charge inwardly through a surrounding body of the charge to a central reaction-zone, and causing volatile products to impart heat to incoming portions of said charge.

3. The herein-described metallurgical process, which consists in feeding a suitable charge downwardly in proximity to the periphery of a furnace and feeding portions of said charge inwardly along radial lines through a surrounding body of the charge to a reaction zone.

4. The herein-described metallurgical process, which consists in feeding a suitable charge downwardly in proximity to the periphery of a furnace, feeding portions of said charge inwardly along radial lines through a surrounding body of the charge to a reaction zone, and causing volatile products to impart heat to incoming portions of the charge.

5. The herein-described metallurgical process, which consists in subjecting one portion of a suitable charge to heat to volatilize a component thereof, conveying said volatilized component outwardly toward the periphery of the furnace through incoming portions of the charge, and condensing it by causing it to impart heat to such portions.

6. The herein-described process, which consists in passing an electric current through a granular resistance body to establish a zone of reaction, and feeding a suitable charge along radial lines to such zone.

7. The herein-described process, which consists in passing an electric current through a granular resistance body to establish a zone of reaction, and separately feeding a suitable charge and divided conductive material along radial lines to such zone.

In testimony whereof I affix my signature in presence of two witnesses.

EDWARD R. TAYLOR.

Witnesses:
HENRY H. McCORKLE,
ALEXANDER HOWELL.